US010409835B2

(12) United States Patent
Teletia

(10) Patent No.: US 10,409,835 B2
(45) Date of Patent: Sep. 10, 2019

(54) EFFICIENT DATA MANIPULATION SUPPORT

(71) Applicant: Microsoft Technology Licensing, LLC, Redmond, WA (US)

(72) Inventor: Nikhil Teletia, Madison, WI (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 609 days.

(21) Appl. No.: 14/556,063

(22) Filed: Nov. 28, 2014

(65) Prior Publication Data

US 2016/0154866 A1 Jun. 2, 2016

(51) Int. Cl.
G06F 16/00 (2019.01)
G06F 16/25 (2019.01)
G06F 16/28 (2019.01)
G06F 16/23 (2019.01)

(52) U.S. Cl.
CPC ........ *G06F 16/258* (2019.01); *G06F 16/2358* (2019.01); *G06F 16/2365* (2019.01); *G06F 16/284* (2019.01)

(58) Field of Classification Search
CPC ........ G06F 17/30368; G06F 17/30595; G06F 17/30569; G06F 17/30371; G06F 17/30; G06F 17/30563; G06F 17/30592; G06F 17/3033; G06F 17/30489; G06F 17/3053; G06F 17/30321; G06F 17/30598; G06F 17/30132; G06F 16/258; G06F 16/2365; G06F 16/284; G06F 16/2358; G06F 16/00; G06Q 30/0256
See application file for complete search history.

(56) References Cited

U.S. PATENT DOCUMENTS 5,457,786 A * 10/1995 Roush ................. G06F 5/06
710/100
5,819,251 A 10/1998 Kremer et al.
6,185,575 B1 * 2/2001 Orcutt .............. G06F 17/30135
707/E17.01

(Continued)

FOREIGN PATENT DOCUMENTS

WO 2012151532 A1 11/2012

OTHER PUBLICATIONS

Lamb, et al., "The Venica Analytic Database: CStore 7 Years Later", In Proceedings of the VLDB Endowment, vol. 5, No. 12, Aug. 27, 2012, 12 pages.

(Continued)

*Primary Examiner* — Anh Ly
(74) *Attorney, Agent, or Firm* — Alleman Hall Creasman & Tuttle LLP

(57) ABSTRACT

Data-manipulation-language statements can target data in data store of a data storage system. Data manipulations specified in a statement, including in-place manipulations, can be recorded and maintained. Application of data manipulations to the store can be avoided or potentially initiated at a later time. Prior to application of the data manipulations to the data store, queries over data in the data store can be processed in view of the recorded data manipulations and data acquired from the data store, such that the data manipulations are reflected in the data acquired from the data store.

25 Claims, 15 Drawing Sheets

(56) References Cited

U.S. PATENT DOCUMENTS

| | | | | |
|---|---|---|---|---|
| 6,460,043 | B1* | 10/2002 | Tabbara | G06F 17/30392 707/E17.014 |
| 6,604,096 | B1 | 8/2003 | Couch et al. | |
| 6,754,666 | B1* | 6/2004 | Brookler | G06F 17/30595 705/29 |
| 6,865,567 | B1* | 3/2005 | Oommen | G06F 16/2462 707/999.002 |
| 8,583,692 | B2 | 11/2013 | Ganesh et al. | |
| 2005/0219929 | A1* | 10/2005 | Navas | H04L 45/7453 365/212 |
| 2006/0047658 | A1* | 3/2006 | Baird | G06F 21/566 714/E11.207 |
| 2006/0184561 | A1* | 8/2006 | Terada | G06F 17/303 707/E17.006 |
| 2006/0277228 | A1* | 12/2006 | Kusunose | G06F 17/30368 707/E17.032 |
| 2008/0071730 | A1* | 3/2008 | Barcia | G06F 17/30595 707/E17.014 |
| 2008/0281877 | A1* | 11/2008 | Wayda | G06F 11/1435 707/E17.005 |
| 2009/0193039 | A1* | 7/2009 | Bradley | G06F 16/2465 707/E17.001 |
| 2011/0258225 | A1* | 10/2011 | Taylor | G06F 17/30336 707/769 |
| 2012/0109926 | A1* | 5/2012 | Novik | G06F 17/30566 707/707 |
| 2013/0151491 | A1* | 6/2013 | Gislason | G06F 16/2282 707/696 |
| 2013/0166508 | A1* | 6/2013 | Eluri | G06F 17/30289 707/634 |
| 2014/0115436 | A1* | 4/2014 | Beaver | G06F 17/2288 715/229 |
| 2014/0164331 | A1* | 6/2014 | Li | G06F 11/1471 707/648 |
| 2014/0172833 | A1 | 6/2014 | Taylor | |
| 2014/0208293 | A1* | 7/2014 | Pusz | G06F 17/30398 717/109 |
| 2014/0279961 | A1* | 9/2014 | Schreter | G06F 3/0608 707/693 |
| 2014/0279963 | A1* | 9/2014 | Schreter | G06F 16/23 707/693 |
| 2015/0032689 | A1* | 1/2015 | Raghunathan | G06F 17/30575 707/610 |
| 2015/0149409 | A1* | 5/2015 | Lee | G06F 17/30575 707/623 |
| 2015/0220529 | A1* | 8/2015 | Eltabakh | G06F 17/30194 707/719 |
| 2015/0293946 | A1* | 10/2015 | Fong | G06F 17/30294 707/811 |
| 2015/0317208 | A1* | 11/2015 | Desantis | G06F 11/1451 707/643 |
| 2015/0363167 | A1* | 12/2015 | Kaushik | G06F 7/24 707/753 |
| 2015/0379054 | A1* | 12/2015 | Kernert | G06F 17/30153 707/625 |
| 2016/0004765 | A1* | 1/2016 | Tyercha | G06F 16/287 707/737 |
| 2017/0235848 | A1* | 8/2017 | Van Dusen | H04L 41/04 705/12 |

OTHER PUBLICATIONS

Gankidi, et al., "Indexing HDFS Data in PDW: Splitting the data from the index", In Proceedings of the VLDB Endowment, vol. 7, No. 13, Sep. 1, 2014, 9 pages.

"Hive Data Manipulation Language", Published on: Oct. 19, 2013, Avaibable at: https://cwiki.apache.org/confluence/display/Hive/LanguageManual+DML.

"How to combine 'delete' and 'insert' operations in one statement?", Published on: Dec. 22, 2013, Available at: http://dba.stackexchange.com/questions/44215/how-to-combine-delele-and-insert-operations-in-one-statement.

"Data Model", Published on: Aug. 27, 2012, Available at: http://hbase.apache.org/book/versions.html.

"PolyBase explained", Published on: Feb. 18, 2014, Available at: http://www.jamesserra.com/archive/2014/02/polybase-explained/.

Int. Search Report cited in PCT Application No. PCT/US2015/061717 dated Mar. 1, 2016, 11 pgs.

"Integration and Virtualization of Relational SQL and NoSQL Systems including MySQL and MongoDB", Ramon Lawrence, 2014, International Conference on Computational Science and Computational Intelligence, pp. 285-290.

Written Opinion cited in PCT Application No. PCT/US2015/061717 dated Sep. 28, 2016, 5 pgs.

Int. Preliminary Report cited in PCT Application No. PCT/US2015/061717 dated Jan. 2, 2017, 12 pgs.

"Batch Processing—Wikipedia, the free encyclopedia", Retrieved from http://web.archive.org/web/20141117001748/https://en.wikipedia.org/wiki/Batch_processing, Nov. 17, 2014, 4 Pages.

"Office Action Issued in European Patent Application No. 15805679.6", dated Jan. 22, 2019, 6 Pages.

* cited by examiner

EFFICIENT DATA MANIPULATION SUPPORT

BACKGROUND

The desire to store and analyze large amounts of data, once restricted to a few large corporations, has escalated and expanded. Much of this data is similar to the data that was traditionally managed by data warehouses, and as such, it could be reasonably stored and processed in a relational database management system (RDBMS). More and more often, however, data is not stored in an RDBMS. Rather, the data is stored in different systems including those that do not entail a predefined and ridged data model. For example, data may be stored and managed in a non-relational format, such as utilizing distributed file system (such as HDFS used in Hadoop framework) and is analyzed with components such MapReduce, among others. However, relational data stored by an RDBMS is formatted as relational data while data stored by Hadoop is non-relational data.

While dealing with relational and non-relational data were separate endeavors for a long time, people are no longer satisfied with this situation. In particular, people analyzing relational data also want to analyze non-relational data, and they want to analyze combinations of both types of data. Similarly, people analyzing non-relational data want to combine it with relational data stored in an RDBMS. Still further, even people analyzing data in an RDBMS may want to use tools like MapReduce, which is typically associated with processing non-relational data, for certain tasks. Keeping data in separate silos is no longer viable.

Various solutions have emerged that enable both relational and non-relational data to be stored and analyzed efficiently and without barriers. One system that emerged is Polybase, which is a feature of a RDBMS parallel data warehouse that provides a single relational view with SQL (Structured Query Language) over both relational and non-relational data.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to efficient data manipulation support. Data manipulations can be received regarding data in a data store. Data manipulations can include in-place manipulations unsupported by a data storage system. Unsupported in-place data manipulations can be effected by reading in a data set from the data store, performing the manipulations on the first data set, and writing a new data set to the data store. Data manipulations can be recorded and applied to data received from the data source to avoid the high cost associated with a applying the manipulations to the data store. Furthermore, a cost reduction can still be achieved if data manipulations are eventually applied to the data store since changes can be batch processed.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
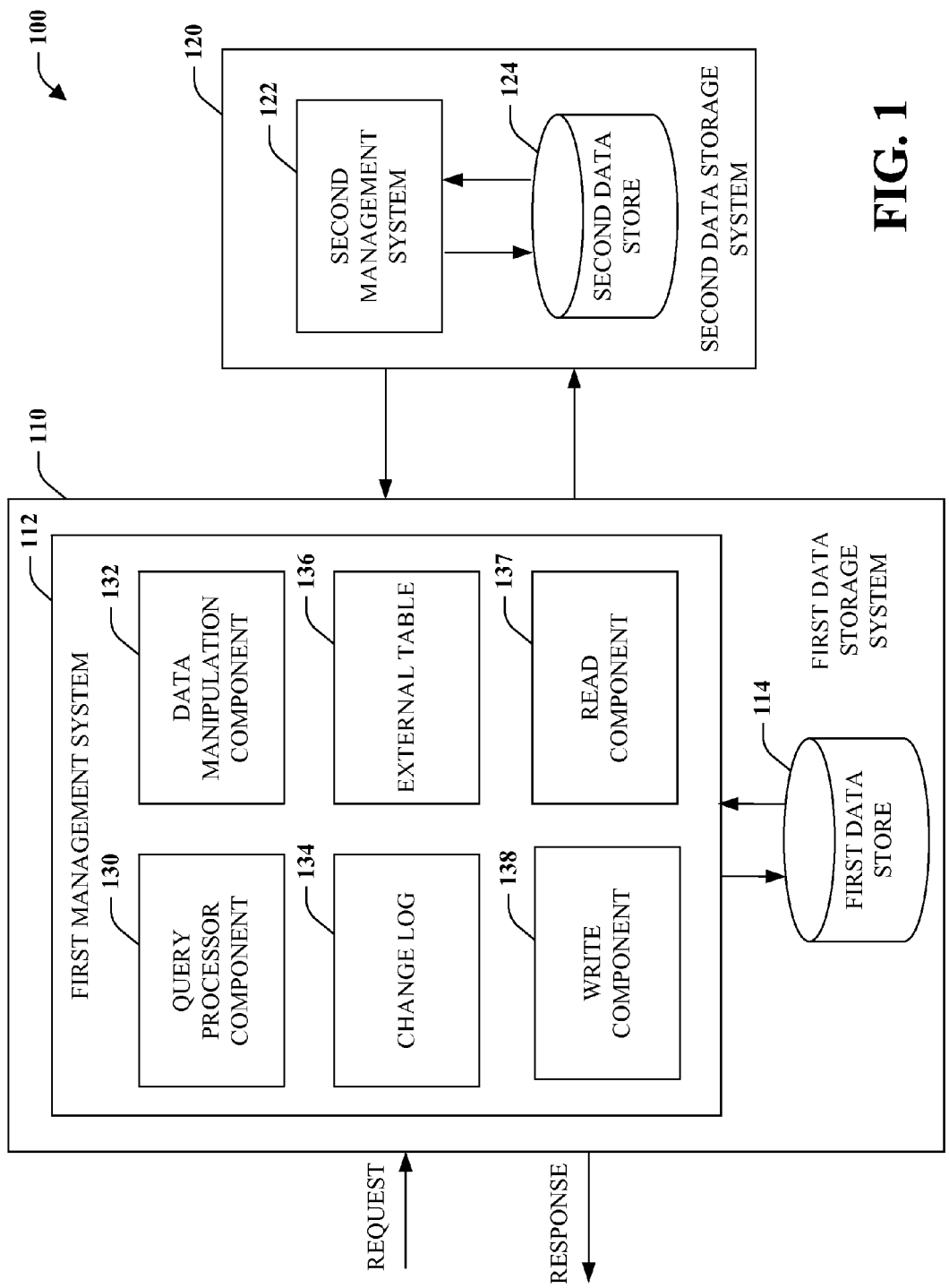
FIG. 1 is a block diagram of an interoperability system.

Data storage systems have varying capabilities with respect to data manipulation. For example, relational data based systems typically provide full support for in-place data manipulation by way of a data manipulation language (DML) for deleting, inserting, and updating data in a database. In one instance, the structured query language (SQL) can be utilized to specify such manipulations over relational data. By contrast, non-relational distributed file systems of web applications, such as Hadoop Distributed File System (HDFS), do not provide full support for in-place manipulations such as delete and update.

An issue exists for systems that operate over multiple data storage systems that implement different support for data manipulation. For example, Polybase, which is a feature of a RDBMS parallel data warehouse, provides a single relational view with SQL (Structured Query Language) over both relational and non-relational data. People who come from a relational data background that submit queries to a RDBMS expect full support for in-place data manipulation since such operations are afforded by a RDBMS. However, data storage systems, such as Hadoop and HDFS, do not provide full support for in-place data manipulation.

One way of bridging the differences is to import an HDFS file into a RDBMS table, make changes in-place, delete the old file, and export to a new HDFS file that reflects the changes from the RDBMS to HDFS. However, the approach is costly in terms of resource utilization (e.g., storage space, network bandwidth . . . ) as well as processing time.

Furthermore, the delay associated with importing a large HDFS file into a table and writing a new file capturing modifications provides a poor user experience.

Details below generally pertain to efficient data manipulation support. Data manipulation statements specifying in-place manipulations can be received targeting data on a data store associated with a data storage system that does not fully support in-place manipulation, wherein in-place manipulation means direct modification of data rather than creating a modified copy of the data. Data manipulations can be recorded and applied to data received from the data store, for example as part of a read query. As a result, the high cost associated with performing in-place data manipulations for each data manipulation on systems without support therefor is avoided. Furthermore, even if in-place manipulations are eventually applied to the data store, cost is reduced since changes can be batch processed. Queries are processed in view of data received from the data store with recorded manipulations applied, thereby ensuring correct results.

In one particular instance, the identity or location of data to be deleted in accordance with an in-place delete can be recorded. Subsequently, such data can be discarded from read operations over data from a data store. Consequently, network communication traffic is reduced. A less efficient alternative is to acquire data from the data store and remove data that corresponds to deleted data.

In accordance with one aspect, data manipulations can be applied to a data store, if the cost associated with recording and application of data manipulations exceeds the cost associated with applying the manipulations to the data. This cost-benefit analysis can be implemented in terms of a predetermined threshold, for example associated with the number of manipulations recorded or the percent of change associated with a data set. Of course, it is also possible to apply the data manipulations periodically (e.g., hourly, daily, monthly . . . ) or at predetermined as well as allow users to initiate application of data manipulations to a data store.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, an interoperability system 100 is illustrated. As shown, the system 100 includes two data storage systems, namely first data storage system 110 and a second data storage system 120. The first data storage system 110 and the second data storage system 120 can be logically or physically separate. In any event, the first data storage system 110 and the second data storage system are communicatively coupled. By way of example, and not limitation, the storage systems can be connected by way of a network (e.g., local area network, wide area network). Both the first data storage system 110 and the second data storage system 120 include management systems and data stores, namely first management system 112, first data store 114, second management system 122, and second data store 124. The first management system 112 and the second management system 122 are configured to manage access to the first data store 114 and the second data store 124. In particular, the management systems process requests for data and return responses by acquiring and writing data to respective data stores. The first data store 114 and the second data store 124 can be embodied as any mechanism that stores data including but not limited single data stores, multiple data stores, and distributed data stores. Furthermore, the first data store 114 and the second data store 124 by be limited to indirect access by a corresponding management system or accessed directly without a management system.

In accordance with one embodiment, the first data storage system 110 can operate as a primary data storage system and the second data storage system 120 can operate as a secondary data storage system. More specifically, the first data storage system 110 can be configured to receive and respond to requests including queries and data manipulations over the first data store 114 and further interact with the second data storage system 120 to process queries and data manipulations over the second data store 124. For example, data can be read as well as deleted, inserted, and updated in response to a query or data manipulation statement. Moreover, data manipulations can correspond to in-place manipulations that directly modify portions of a data set such as a single row. In one particular implementation, the first data storage system 110 can be a parallel data warehouse appliance that operates over relational data stored in the first data store 114, which can be a distributed store, and the second data storage system 120 can correspond to a Hadoop system that operates over a non-relational data in distributed file system (e.g. HDFS) on the second data store 124. For clarity and brevity, the subject description focuses on this embodiment. However, the system 100 is not limited thereto. For example, the first data storage system 110 can correspond to a relational database management system and second storage system 120 can correspond to an unstructured data provider. Furthermore, although FIG. 1 depicts solely two data storage systems, it is to be appreciated that the first data storage system 110 can operate with respect to any number of other data storage systems.

Here, the first data storage system 110 includes query processor component 130, data manipulation component 132, change log 134, external table component 136, read component 137, and write component 138. The query processor component 130 is a mechanism configured to enable queries to be processed with respect to the first data store 114, the second data store 124, or both the first data store 114 and the second data store 124. After receipt of a query, the query processor component 130 generates a query plan, executes the plan, and returns a response. In an embodiment in which the first data storage system 110 operates over relational data and the second data storage system 120 operates with respect to non-relational data, a table can be created that provides a relational representation of non-relational data. The external table 136 includes metadata that defines structure (e.g., table columns) for and identifies the location of data stored in the second data store 124. However, the external table 136 does not include the data stored in the second data store 124. The query processor component 130 can process a query over relational tables of the first data store 114 and/or the external table representation of data of the second data store 124. The read component 137 is configured to acquire or import data that satisfies the query by reading data from the second data store 124 directly from the second data store 124 or indirectly by way of the second management system 122. A relational representation of the data is created based on the metadata of the external table 136 and utilized to produce a result. Further, imported data associated with the external table is typically read-only and not subject to modification.

A query can specify not only a read operation but also data manipulations such as delete, insert, and update. Furthermore, it may be expected that in-place data manipulations are supported, which directly modify part of a data set (e.g. file, chunk, blob . . . ) as oppose to create a new data set that reflects the modification and potentially replaces an old data set. However, imported data associated with the external table is typically read-only and not subject to modification. Furthermore, the second data storage system 120 may not fully support in-place manipulations by way of the second management system 122.

If a request includes data manipulation such as deletion, insertion, or updating, as opposed to a mere read query, the query processor component 130 can invoke the data manipulation component 132 for processing. The data manipulation component 132 is configured to support in-place data manipulation operations over read-only data even if the operations are not supported by the secondary storage system 120. This can be accomplished by recording manipulations in a container such as change log 134. In accordance with one embodiment, the change log 134 is table stored in the first data store 114, associated with the external table 136. However, the change log 134 can take another form and be stored anywhere, as long as the first data storage system 110 can access the change log 134 when needed. For example, if the second data storage system 120 supports appends, the change log 134 can be stored in the second data store 124 and utilized by the second management system 122. The change log 134 can be utilized when data is loaded from the second data store 124 by the read component 137 such that the data returned reflects changes specified in the change log. For example, rows can be deleted, added, or deleted and subsequently added.

Figure 2:
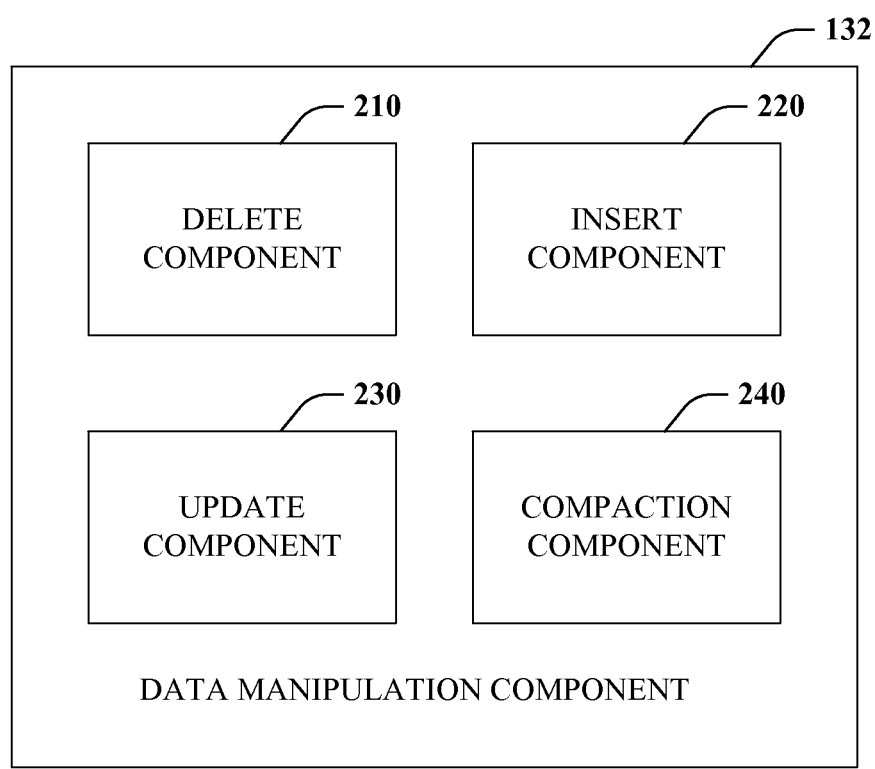
FIG. 2 is a block diagram of a representative data-manipulation component.

Turning attention to FIG. 2, a representative data-manipulation component 132 is illustrated. The data manipulation component 132 includes delete component 210, insert component 220, update component 230, and compaction component 240. The delete component 210 is configured to record deleted elements such as rows in the change log 134. In one instance, deleted elements can be identified by a unique identifier such as a row identifier (RID), for example comprising a file name and a row-offset (for text files) or a primary key. After a delete statement specifying an in-place delete is received, the delete component 210 can identify applicable rows by RID, for instance, that satisfy a predicate (e.g., a set of criteria) associated with the delete operation, and add them to the change log 134. The change log 134 can be embodied as a table stored in the first data store 114. In that case, a delete query that specifies:

```
DELETE FROM customer_hdfs
WHERE c_NAME like %121%"
``` can be transformed or used by the delete component 210 to generate:

```
INSERT INTO delete_delta_cust_HDFS
SELECT RID
FROM customer_hdfs
WHERE c_name like "%121%
```

Here, the change log 134 is named "delete_delta_custH-DFS." RIDs from an external table "customer_hdfs" that satisfy the predicate "c_name like "%121%" (customer name matches a string pattern "%121%," where "%" is a wildcard specifying missing characters) are inserted into the change log 134.

Returning briefly to FIG. 1, as noted above the change log 134 can include identification of deleted elements such as rows. This information can be used in different ways. In particular, delete information can be utilize during or after a read or scan of data stored in the second data store 124 by the read component 137. During a read, for example associated with a read query, deleted elements can be provided to the read component 137, and the read component 137 can discard elements that correspond to deleted elements. In accordance with one implementation, data can be read directly from the second data store 124, and data corresponding to deleted elements disregarded during a read operation over the second data store 124. In accordance with another implementation, the read component 137 can generate a statement/command acceptable by the second management system 122 that causes data to be read with the exception of deleted elements. The statement can be provided to the second management system, which will execute the statement and return data with deleted data filtered out to the first data storage system 110. Regardless of implementation, performing a delete during a read, for example in conjunction with a read query (e.g., select query), is beneficial since deleted elements need not be read or imported into the first data storage system 110 saving temporary and/or persistent storage space (e.g., memory and disk) on the first data storage system 110 and reducing network traffic. In a post read or scan scenario, all rows that satisfy a predicate are read and imported into the first storage system 110. Subsequently, an anti-join or the like can be performed between the imported data and the change log 134 such that deleted data is removed. This approach can ultimately reduce use of storage space after deleted data is removed, but is not as efficient as the previous approach at least in that use of network bandwidth is not reduced.

The insert component 220 can be configured to record data to be inserted or added in the change log 134. More specifically, after receipt of an insert statement, additional elements identified by the insert statement are added to the change log 134. After the read component 137 imports data from the second data store 124 directly from the store or indirectly by way of the second management system 122, the recorded data elements in the change log are added to the imported data by way of a append, join, or other operation. If the secondary storage system 120 provides support of additions by way of an append operation, for example, the insert component 220 can be configured to initiate addition of the rows to the secondary data store 124 by way of the write component 138. A hybrid approach is also possible, wherein for insertion of a large number of rows, as specified by a predetermined threshold, the insert component 220 can initiate insertion into the second data store 124 bypassing use of the change log 134. However, for a small numbers of rows, as defined by a predetermined threshold, the insert component 220 can add the rows to the change log 134. Subsequently, once the number of rows reaches another predetermined threshold the rows can be added to the second data store 124.

The update component 230 is configured to employ the change log 134 in conjunction with received update statements or operations. Update is essentially a delete and followed by an insert. Accordingly, functionality described above with respect to delete and insert can be applied to implement update operations. For further clarity, consider the below implementation upon receipt of the following update statement:

```
UPDATE customer_hdfs
SET c_nationkey =10
WHERE c_custkey = 1
```

First, all rows that satisfy the predicate "c_custkey=1" are imported into a temporary table "temp_1," for example by executing the following statement:

```
SELECT RID, *
FROM customer_hdfs
WHERE c_custkey =1
```

The change log 134 can be updated with the row or rows affected by the update. Next, the temporary table can be updated, for example utilizing the following statement:

```
UPDATE temp_1
SET c_nationkey =10
WHERE c_custkey=1
```

Finally, the temporary table is used to populate the external table "customer_hdfs" with the following statement:

```
INSERT INTO customer_hdfs
SELECT *
FROM temp_1
```

Use of the temporary table circumvents issues regarding if external table instances are read-only. Accordingly, it should be appreciated that a temporary table can also be utilized as described above with respect to solely a delete or insert.

The compaction component 240 is configured to perform compaction by draining the change log and applying changes to a data store such as the second data store 124. In operation, data for an external table is imported, changes are made to the data set in accordance with data manipulations recorded in the change log, and a new data set (e.g., file, block, blob, chunk . . . ) that captures the changes is added to the secondary data store. As noted previously, this approach is costly in terms of resource utilization (e.g., storage space, network bandwidth . . . ) and processing time. In accordance with one embodiment, compaction is initiated when the cost of applying changes to imported data exceeds the cost of applying of effecting the changes on a data store. This can be captured by a predetermined threshold based on the number or percentage of data elements deleted and/or the number or percentage of the data elements added.

Figure 3:
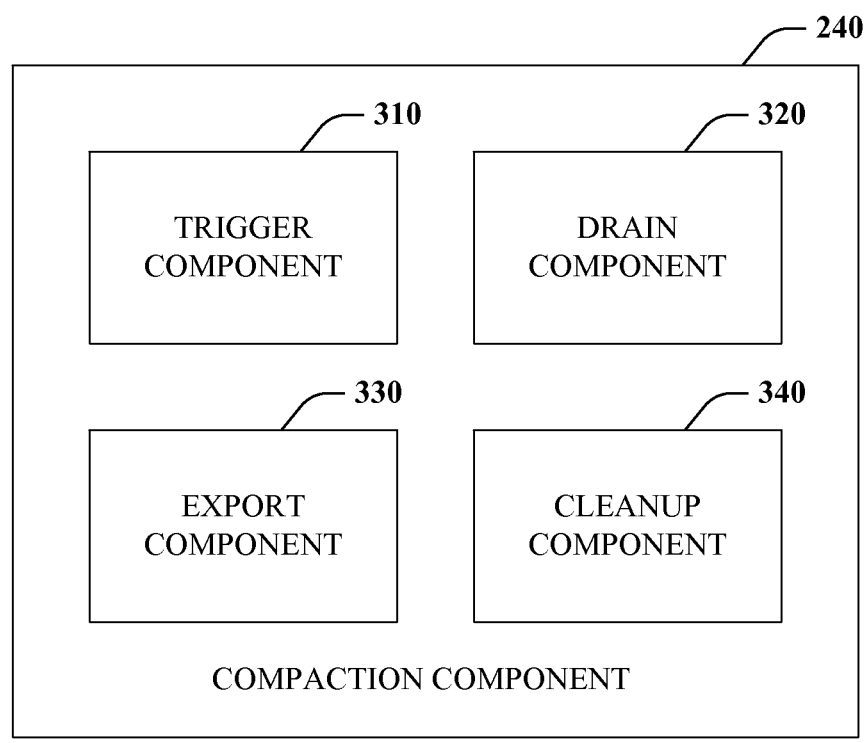
FIG. 3 is a block diagram of a representative compaction component.

FIG. 3 illustrates a representative compaction component 240 in further detail. As shown, the compaction component 240 includes trigger component 310, drain component 320, export component 330, and cleanup component 340. The trigger component 310 is configured to analyze the change log and determine whether a predetermine threshold is met to trigger compaction. It is desirous to avoid the large performance hit associated with generating and writing a new file to a data store by incurring the cost of reading data and applying changes. However, performance of an external table deteriorates over time because of increasing overhead associated with importing data and applying changes. When the cost of importing and applying changes exceeds the cost of generating and writing a file to a data source, compaction can be triggered. The trigger component 310 can make this determination based on a comparison of the number or percentage of rows deleted and/or added to a predetermined value. If a predetermined threshold is reached or exceeded, the trigger component 310 can initiate compaction by invoking the drain component 320. Further, compact initiation is not limited to threshold-based triggering. It is also to be appreciated that that compaction can also be initiated by a user or automatically run at a scheduled time.

The drain component 320 is configured to drain the change log by writing additions to a data store. For example, if the second data storage system 120 supports an append, or like operation, the additional data can be provided thereto and subsequently appended to the corresponding data set (e.g., file, block, blob . . . ). The export component 330 is invoked upon completion of the drain operation.

The export component is configured to export data reflecting deletions to the second data store 124 by invoking the write component 138 of FIG. 1. Prior to invoking the write component 138 data is read or imported from the second data store 124 based on the external table. The data read in, or imported, results in removal of deleted data noted in the change log 134. Furthermore, additions were previously appended and therefore present in the read data. The read data can now be written to the second data store 124 by invoking the write component 138 such that the new data replaces the old data. In accordance with one particular implementation, a new external table can be created using a create external table as select (CETAS) operation provided by the first data storage system 110. This corresponds to creating a new table for the result of a select query. For example, the operation can be specified as follows:

```
CREATE EXTERNAL TABLE customer_hdfs_temp
As
SELECT * FROM customer_hdfs
```

Next the original external table "customer_hdfs" is renamed "customer_hdfs_old," and new external table "customer_hdfs_temp" is renamed the original name "customer_hdfs."

After the data is written to a store, the cleanup component 340 is invoked. The cleanup component 340 is configured to drop and delete the created external table and its data imported data from the second data store 124. Furthermore, the cleanup component 340 is configured to delete the change log or data therein identifying data designated for at least deletion.

Figure 4:
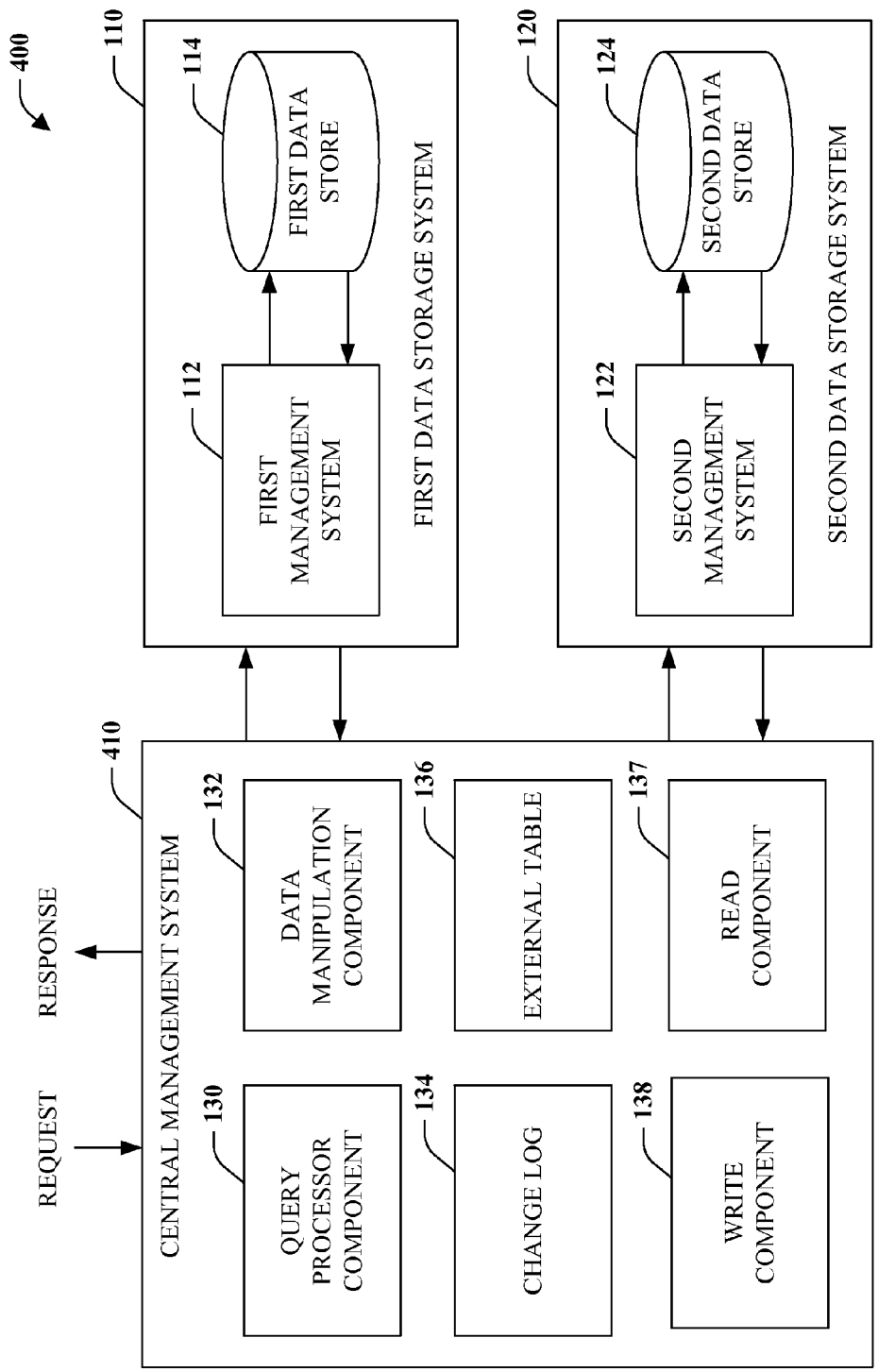
FIG. 4 is a block diagram of an interoperability system.

Turning to FIG. 4 an interoperability system 400 is illustrated. The interoperability system 100 of FIG. 1 concerned an embodiment in which data manipulation functionality was performed by one of a plurality of data storage systems. However, the subject invention is not limited thereto. As shown, data manipulation functionality can be implemented by central management system 410, which interacts with at least the first data storage system 110 and the second data storage system 120. As previously described, the first data storage system 110 and the second data storage system 120 include, respectively, the first management system and first data store 114, and the second management system 122 and the second data store 124. The first management system 112 and the second management system 122 manage access and interaction with the first data store 114 and the second data store 124, which both can store data in a variety of ways including distributed across a number of nodes in a computer network. Here, the central management system 410 includes the query processor component 130, data manipulation component 132, change log 134, external table 136, read component 137, and write component 138, as previously described. In this instance, the central management system 410 receives requests such requests and returns responses with respect to data stored in the first data store 114, the second data store 124, or both the first data store 114 and the second data store 124. The query processor component 130 generates a query plan, executes the plan, and returns a response to acquire data from one or both of the first data store 114 and the second data store 124 that satisfies a query. If the request includes a query or other statement or command pertaining to deleting, inserting, or updating data, the data manipulation component 132 can be invoked. Briefly, the data manipulation component 132 enables delete, insert, and update functionality to be recorded in the change log 134 rather than applying the data manipulations to a data store. Subsequently, when data is read from a store associated with the change log 134, for example in response to a read operation for a query, the data manipulations are applied during a read of a data store or after data is read in or imported from a data store. Although not limited thereto, in accordance with one embodiment, the central management system 410 can be implemented of relational database technology. In this case, the external table 136 can specify structure (e.g., table columns) for and identify the location of data stored in a data store, and the read component 137 can employ the external table to guide reading. At some point, it may be desirous to effect data manipulations on a data store, for example based on a policy, schedule, or user initiation. In this case, the write component 138 can be employed to write data to a data store.

In accordance with one particular implementation, the first data storage system can operate with respect to relational data and the second data storage system 120 can operate with respect to non-relational data. More specifically, the first management system can correspond to a relation database management system (RDBMS) and the first data store can be a relational database. Further, the second management system 122 can correspond to Hadoop or a Hadoop framework implementing MapReduce, and the second data store 124 can correspond to a distributed file data (e.g. HDFS). In this case, the second data storage system 120 may not provide full support for in-place data manipulations, which are provided by the first data storage system. This mismatch between functionality can be bridged by importing data from the second data store 124, making changes, and exporting the database to the second data store 124. However, as noted previously, this can be an expensive operation to be avoided or at least delayed to exploit batch processing. The central management system implements functionality that can record data manipulations and apply the data manipulations to data acquired from the second data store 124 thereby avoiding the cost of effecting changes on the second data store for each data manipulation request. However, at some predetermined, schedule, or user-initiated point, the central management system can effect changes on the second data store.

Figure 5:
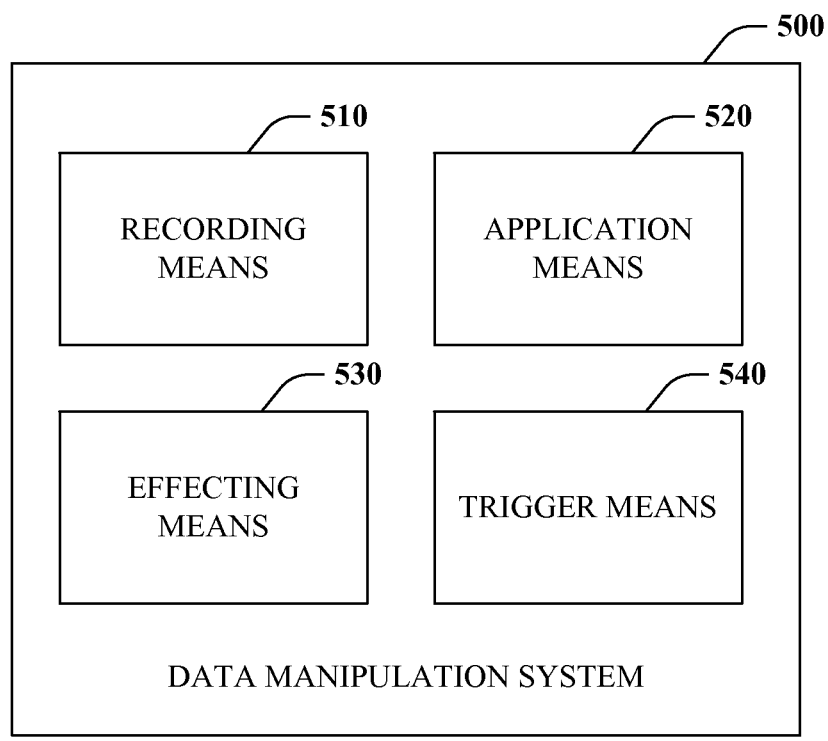
FIG. 5 is a block diagram of a data manipulation system.

FIG. 5 depicts a data manipulation system 500 that can be employed to process data manipulations. The system 500 includes recording means 510, application means 520, effecting means 530, and trigger means 540. The recording means 510 can be embodied hardware, software or a combination of hardware and software for recording data manipulations, including in-place data manipulations. For example, the recording means can save data manipulations or information regarding manipulation to a container such as a change log. In one instance, the recording means can save an identifier and/or a location associated with data to be deleted. In other instance, the recording means can save data to be inserted into a data set.

The application means 520 employs hardware, software, or a combination of hardware and software apply recorded data manipulations to data acquired from a data store. In order to process a query for data stored on a data store the data is read. The application means 520 operates with respect to this reading functionality to apply data manipulations. In accordance with one embodiment, the application means 520 can operate during a read such that data designated for deletion, as recorded in a change log, is discarded and not read or acquired, for example. In accordance with another embodiment, the application means 520 operates over data after it is read or imported, for example to discard data corresponding to data designated for deletion. Furthermore, the application means 520 can add data designated for insertion to data acquired from a data store.

The effecting means 530 effects or causes recorded data manipulations to be applied to a corresponding data store. Embodied as hardware, software, or a combination of hardware and software, the effecting means 530 can read recorded data manipulations, in a change log for example, and utilize supported mechanisms associated with modifying a data store to apply or commit the data manipulations to the data store. Where a data management system or the like supports a particular operation, that operation can be employed to effect changes to data. For example, if an append operation is supported, data designated for insertion can be inserted into a data set by execution of a specified append operation. Where support is not provided, for example with respect to in-place manipulations such as deletion, the effecting means can import data from the data store, apply the data manipulations, and export the data reflecting the data manipulations to the data store, for example.

The trigger means 540 triggers or initiates application of data manipulations to a data store by invoking the effecting means 530. The trigger means 540 can be embodied as hardware, software, or a combination of hardware and software that initiates data manipulation application to a data store in a variety of scenarios. In one instance, a predetermined threshold can be establish with respect to recorded manipulations regarding the number of data manipulations or the percent change to a data set, of example. The threshold in one embodiment can capture a point at which the cost of recording and applying change to acquired data exceeds the cost of effecting changes to a data store. Here, the trigger means 540 can compute a value or monitor computation by another mechanism associated with recorded manipulations, compare the value with the threshold, and trigger application of changes to a data store if the threshold is exceeded. In another instance, the trigger means 540 can initiate application of data manipulations in accordance with a schedule (e.g., hourly, daily, weekly, monthly . . . ). In yet another instance, the trigger means 540 can be activated upon recite of a user-initiated command to effect data manipulations on a data store.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the trigger component 310 can employ such mechanisms to determine or infer when to initiate compaction, for instance based contextual and historical information.

In view of the exemplary systems described above, methodologies that may be implemented in accordance with the disclosed subject matter will be better appreciated with reference to the flow charts of FIGS. 6-14. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
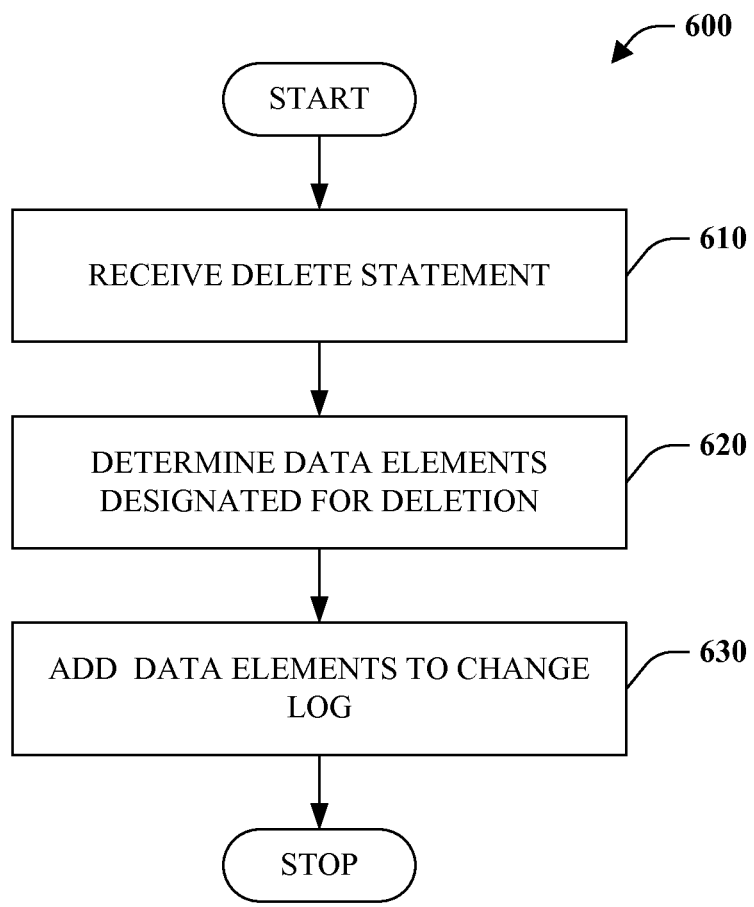
FIG. 6 is a flow chart diagram of method of processing a delete statement.

Referring to FIG. 6, a method 600 of processing a delete statement is illustrated. At reference numeral 610, a delete statement is received, for example embodied as a query or command sent to a primary storage system. At numeral 620, one or more data elements (e.g. rows) designated for deletion are determined. In accordance, with one instance, the data elements can be determined based on the delete statement alone, for instance, where individual elements are specifically identified. Alternatively, data may be specified with a predicate identifying data to be deleted. In this case, a data read can be performed and data that satisfies the predicate can be identified thereby identifying data to be deleted. In accordance with one implementation, a stored procedure can identify data elements based on the name of a file and a range comprising a start index and end index. At numeral 630, data elements designated for deletion are added to a change log or other container. In accordance with one embodiment, the change log can be embodied as a table stored in a data store of a primary data storage system. Other embodiments are also possible including storing the change log on the in a secondary data store. In one instance, data can be identified and saved to the change log by record identifier (RID), which specifies a file name and index into the file, for example.

Figure 7:
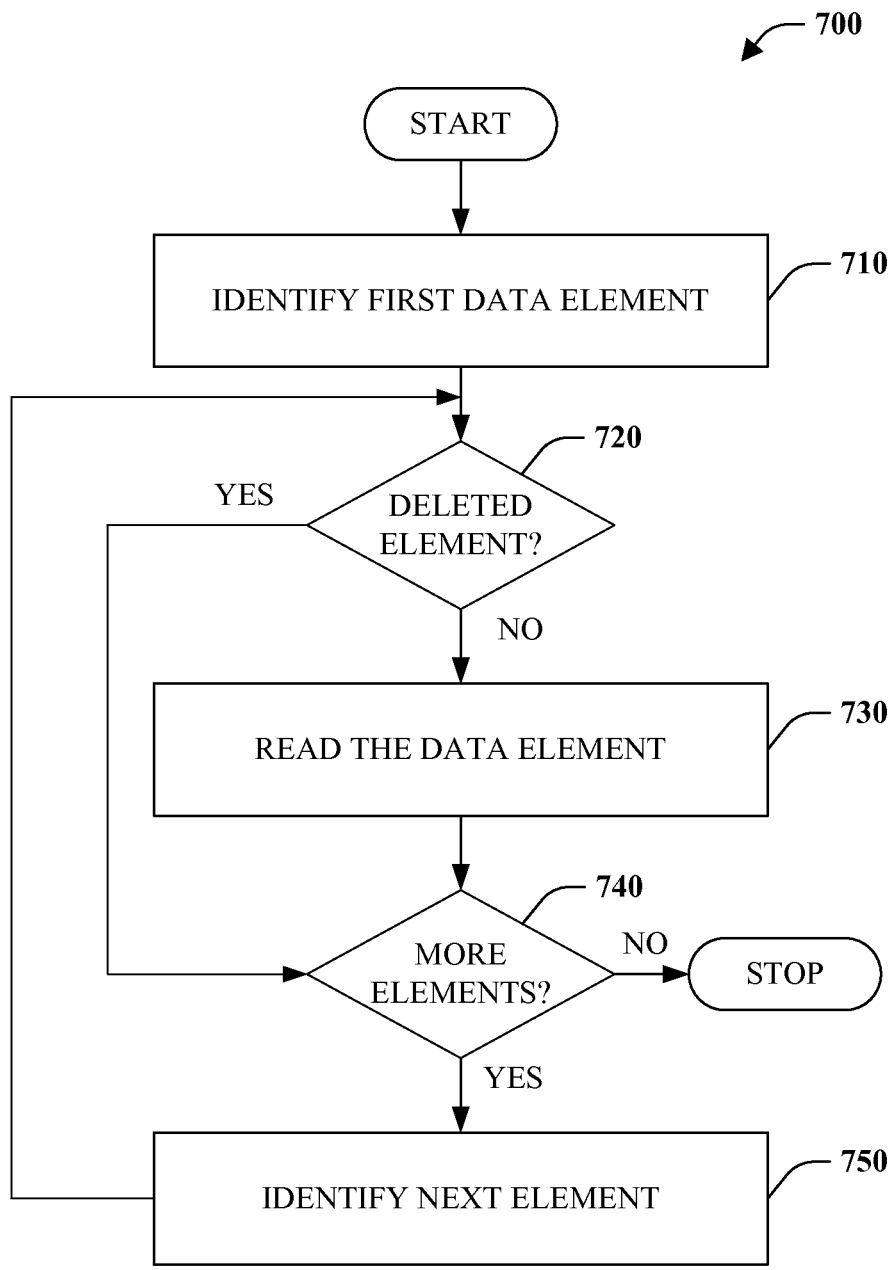
FIG. 7 is a flow chart diagram of a method of performing a delete.

FIG. 7 depicts a method 700 of performing a delete. At reference numeral 710, a first data element such as a row is identified. At numeral 720, a determination is made as to whether or not the first data element corresponds to a deleted element. This determination can be performed by comparing the element to a one or more data elements recorded in a change log. If the data element matches a data element in the change log, the data element corresponds to a deleted element. Otherwise, the data element is not a deleted element. If the data element is a deleted element ("YES"), the method continues at numeral 740. If the data element is not a deleted element ("NO"), the method proceeds to reference numeral 730 where the data element is read or in other words imported or loaded. Accordingly, deleted elements are not read. The method next continues at numeral 740, where a determination is made as to whether or not there are more data elements to process. If there are no more data elements to process ("NO"), the method simply terminates. On the other hand, if there are more data elements to process ("YES"), the method proceeds to reference numeral 750 where the next data element is identified. The method then loops back to numeral 720, which determines whether or not the data element corresponds to a deleted element. Here, data elements designated for deletion are discarded once identified and not read.

Figure 8:
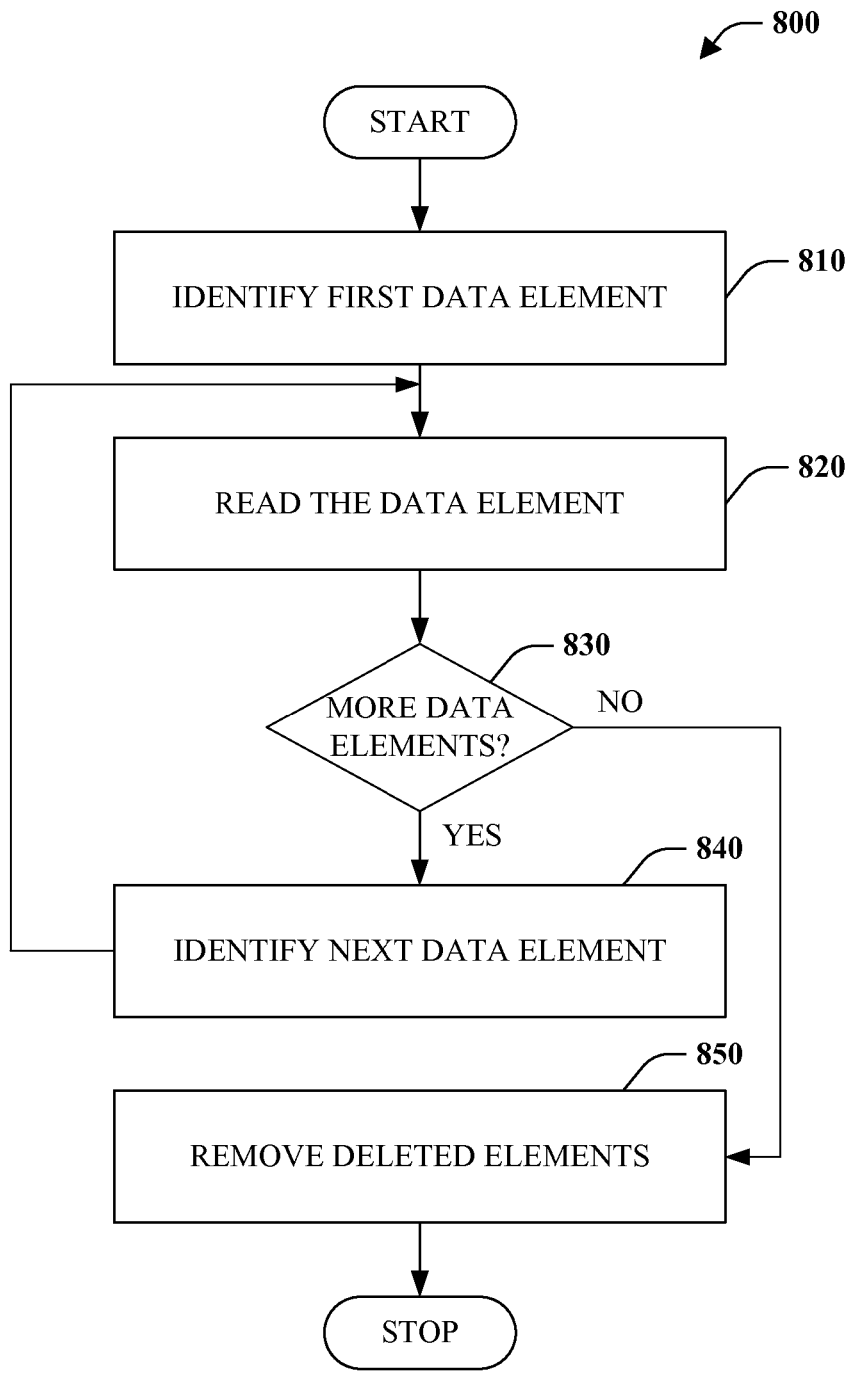
FIG. 8 is a flow chart diagram of a method of performing a delete.

FIG. 8 illustrates a method 800 of performing a delete. At reference numeral 810, a first data element, such as a row, is identified. The identified data element is next read at numeral 820 and the method proceeds to numeral 830. A determination is made at numeral 830 as to whether or not there are more data elements to process. If there are more data elements to process ("YES"), the method continues at numeral 840 where the next data element is identified. Subsequently, the method loops back to numeral 820 where the data element is read. If there are no more data elements to process ("NO"), the method continues at 850 where deleted data elements are removed. Deleted data elements can be identified in a change log. In accordance with one implementation, an anti-join or other operation can performed to remove read data elements if they are designated for deletion in the change log. In this instance, all data is read and subsequently data elements designated for deletion are removed.

Figure 9:
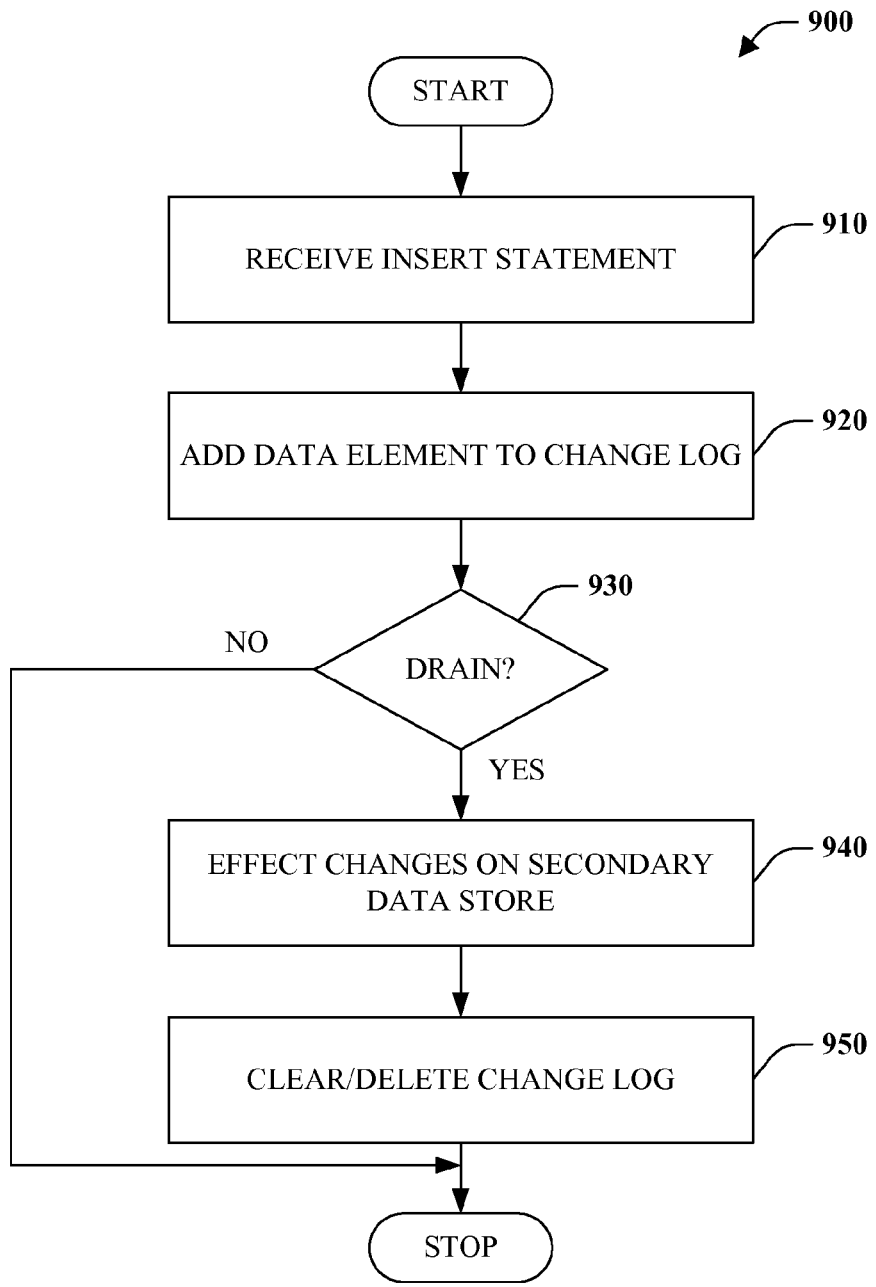
FIG. 9 is a flow chart diagram of a method of processing an insert statement.

FIG. 9 depicts a method 900 of processing an insert statement. At reference numeral 910, and insert statement is received, for example embodied as a query or command sent to a primary storage system. At reference numeral 920, data to be inserted in accordance with the insert statement is added to a change log. At numeral 930, a determination is made as to whether to drain the change log and add the data to a store. For example, if a data storage system supports an append operation inserted data can be appended to a corresponding file by invoking the append operation for inserted data in the change log. The determination can be made automatically based on a predetermined and defined threshold pertaining to the number or percentage data elements (e.g., rows) to be inserted. For example, for a large number of data elements, the data elements can be added to an external file. Otherwise, the data elements can remain in the change log to be later added to an existing file. Changes can also be applied to a data store automatically at the scheduled times or a user can trigger addition of inserted data by way of a corresponding command. If it is determined that the change log is not to be drained ("NO"), the method terminates. If it is determined that change log is to be drained ("YES"), the method continues at 940, where changes are effected on a store such as a second data store. As noted above, if a management system associated with a store supports append operations, the data identified in the change log can be provided to the storage system to append the data. At reference numeral 950, the change log can be cleared of data to be inserted or deleted.

Figure 10:
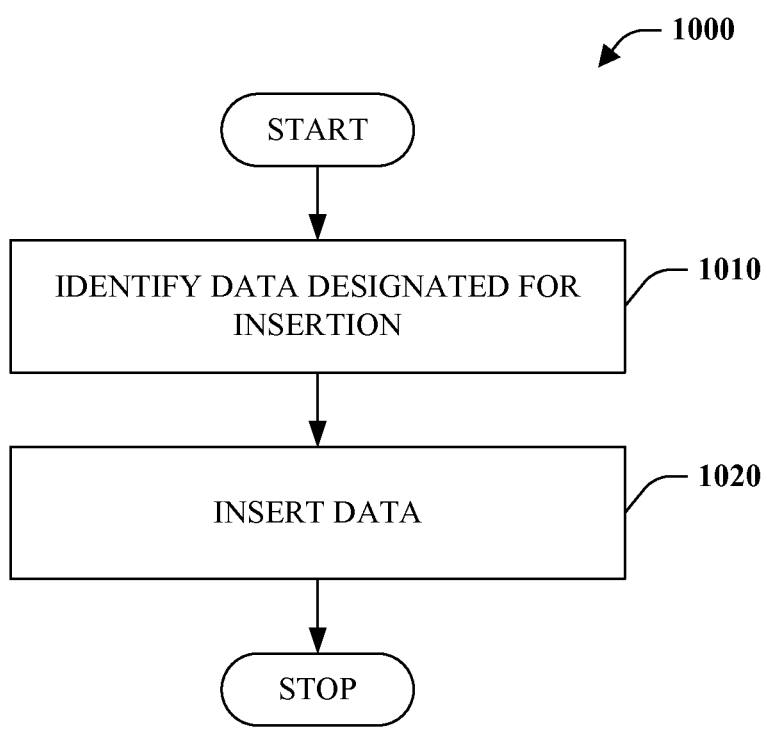
FIG. 10 is a flow chart diagram of a method of data insertion.

FIG. 10 illustrates a method 1000 of data insertion. At reference numeral 1010, data designated for insertion is identified by consulting a change log. At numeral 1020, the data is acquired, for example from the change log or other location specified by the change log, and inserted into a data structure, such as file. Assuming a storage system supports an append operation, the identified data can be inserted by way of appending the data to a designated data structure. If, however, such an append operation is not available, the act of inserting data can include first importing data from an data store, appending the data to the imported data, and exporting the altered data to the data store replacing the original data.

Figure 11:
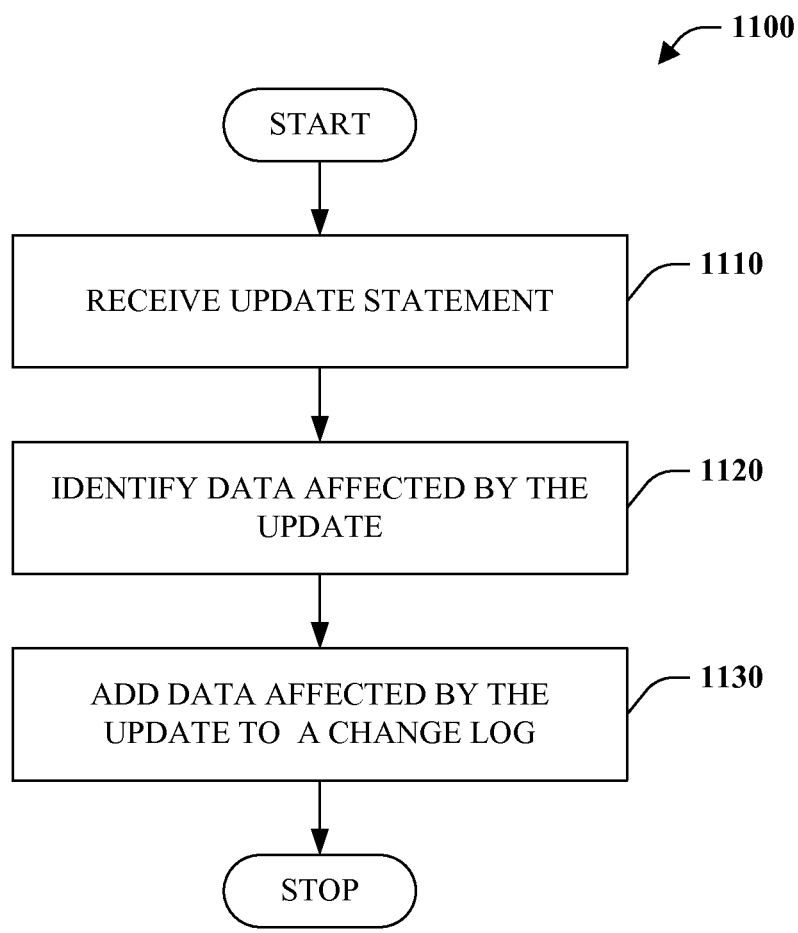
FIG. 11 is a flow chart diagram of a method of processing an update statement.

FIG. 11 illustrates a method 1100 of processing an update statement. At reference numeral 1110, an update statement is received for example as a query or part of a query received by a primary data storage system. The update statement references at least a portion of data in a data store. At reference numeral 1120, data to be updated is identified. In one instance, such data may be able to be determined from the update statement alone. In another instance, a data to be updated can be specified with a predicate. In this case, a data read or scan can be performed on a data store, and data that satisfies the predicate can be identified, which thereby identifies data affected by the update. At reference numeral 1130, data affected by the update is added to a change log. In particular, the change log can be updated to reflect deletion of particular data elements and addition of data elements. In other words, deletion and insertion data can be identified separately. Alternatively, the change log can record updates to particular data elements or rows.

Figure 12:
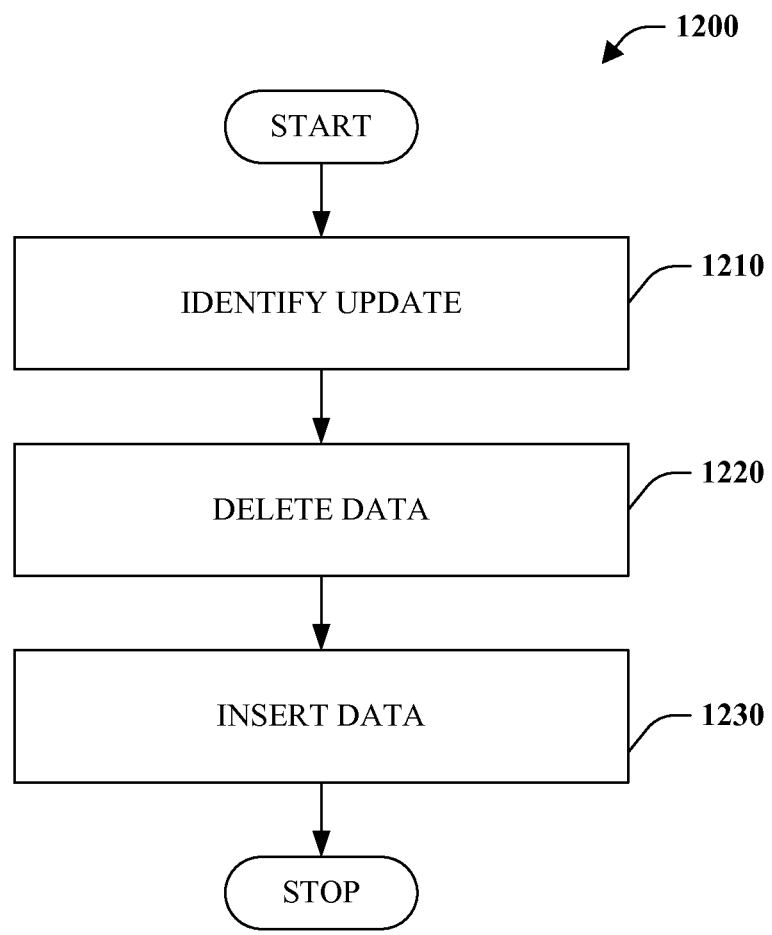
FIG. 12 is a flow chart diagram of a method of performing an update.

FIG. 12 shows a method 1200 of updating data. At reference numeral 1210, an update is identified from a change log. The update can specify data to delete as well as data to insert. At numeral 1220, data is deleted in accordance with the update. Deletion can be performed during or after a read as described above with respect to FIGS. 7 and 8. A reference 1230, data is inserted specified by the update. Data can be inserted through use of an append operation if provided by a secondary storage system or through local addition to imported data and exporting altered data, as described above with respect to FIG. 10. An update can be implemented with a delete followed by an insert as described. However, an update an also be implemented as an insert followed by a delete.

In one embodiment, an issue can result if an insert statement is issued followed by a delete or update statement, where the insert statement and delete or update statement populate the change log. Here, inserted data elements or rows may not have a unique identifier (e.g., record identifier) associated therewith since they have not been written to storage yet. There are at least two options to address this issue. First, the inserted data can be drained from the change log and written to storage so that identifiers are acquired for the inserted data. Second, the delete or update can be applied on the change log such that affected rows are deleted/updated in log directly.

Figure 13:
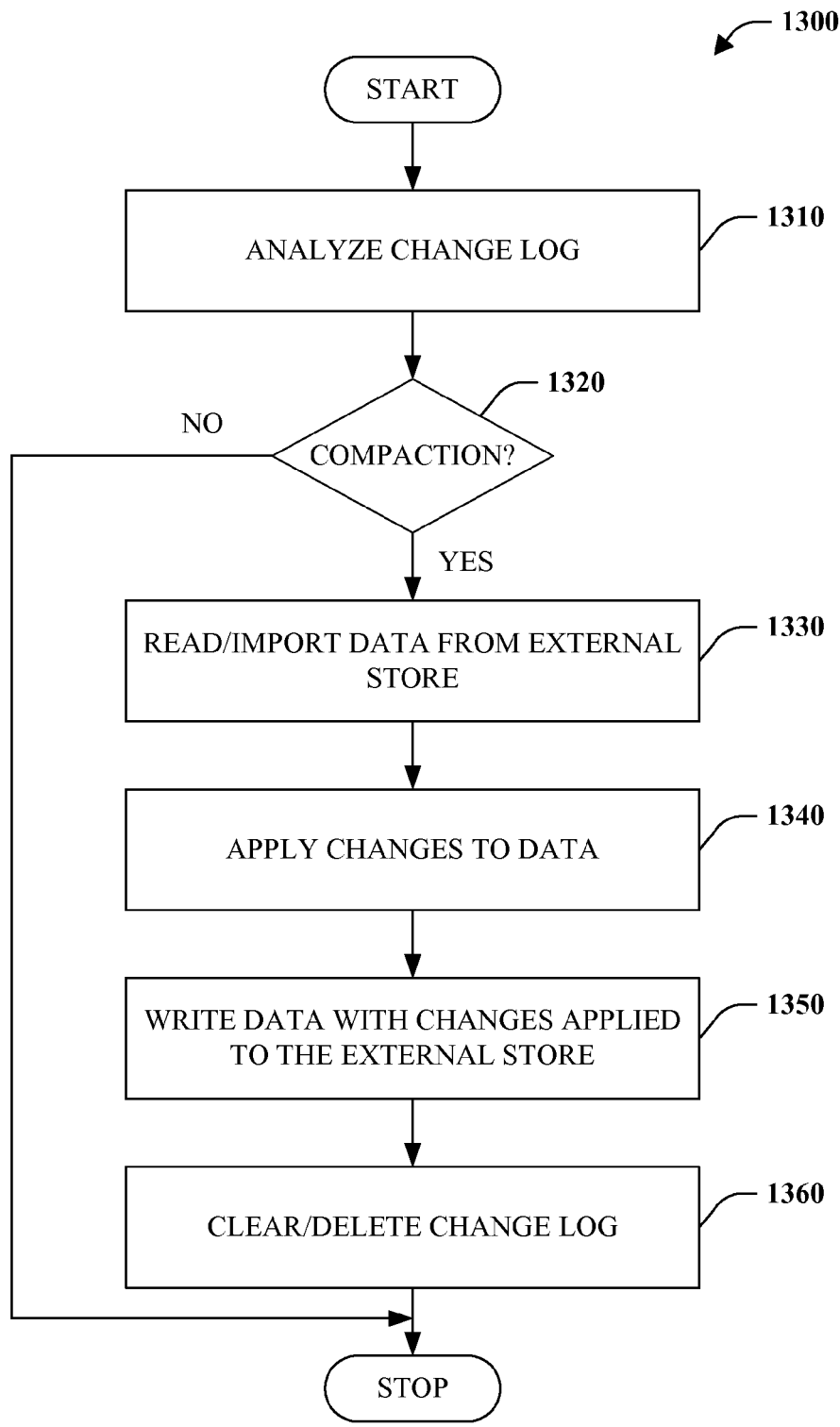
FIG. 13 is a flow chart diagram of a method of data compaction.

FIG. 13 illustrates a method 1310 of data compaction. At reference numeral 1310, one or more change logs are analyzed, wherein change logs specify data to be deleted, added, and/or updated. A determination is made, at numeral 1320, as to whether or not data compaction is to be initiated, wherein data compaction effects changes on a data store. Effecting changes on a store is costly in terms of resource utilization (e.g., storage space, network bandwidth . . . ) and processing time. However, performance of applying changes (e.g., after data has been read or during a read operation) deteriorates over time because of overhead associated with importing data and applying an increasing number of changes. In accordance with one embodiment, compaction can be initiated when the cost of applying changes to imported data exceeds the cost of effecting the changes on a data store. This can be captured by a predetermined threshold based on the number of data elements changed or the percentage of data changed (e.g., more than half a data file is changed), among other things. In accordance with another embodiment, compaction can be scheduled to execute at predetermined or periodic times (e.g., once a day, once a week, once a month . . . ). If, at numeral 1320, it is determined that compaction should not be initiated ("NO"), the method can terminate. Alternatively, if, at numeral 1320, it is determined that compaction should be initiated ("YES"), the method continues at numeral 1330. Data is read or in other words imported from a data source at numeral 1330. At reference numeral 1340, changes are applied to the data. The changes can correspond to deletions, insertions and/or updated operations captured in a change log or other container. Although noted after reading data, it should be appreciated that at least deletions can be performed during reading, for example by discarding deleted elements. This can reduce the size of data imported preserving memory/storage space and reducing network traffic. At numeral 1350, the data with changes applied are written to a data store. For example, a secondary data storage system and operations provided thereby can be employed to add the new data and delete previous data. Finally, at reference numeral 1360, the change log or other container of changes can be cleared of changes or deleted.

Figure 14:
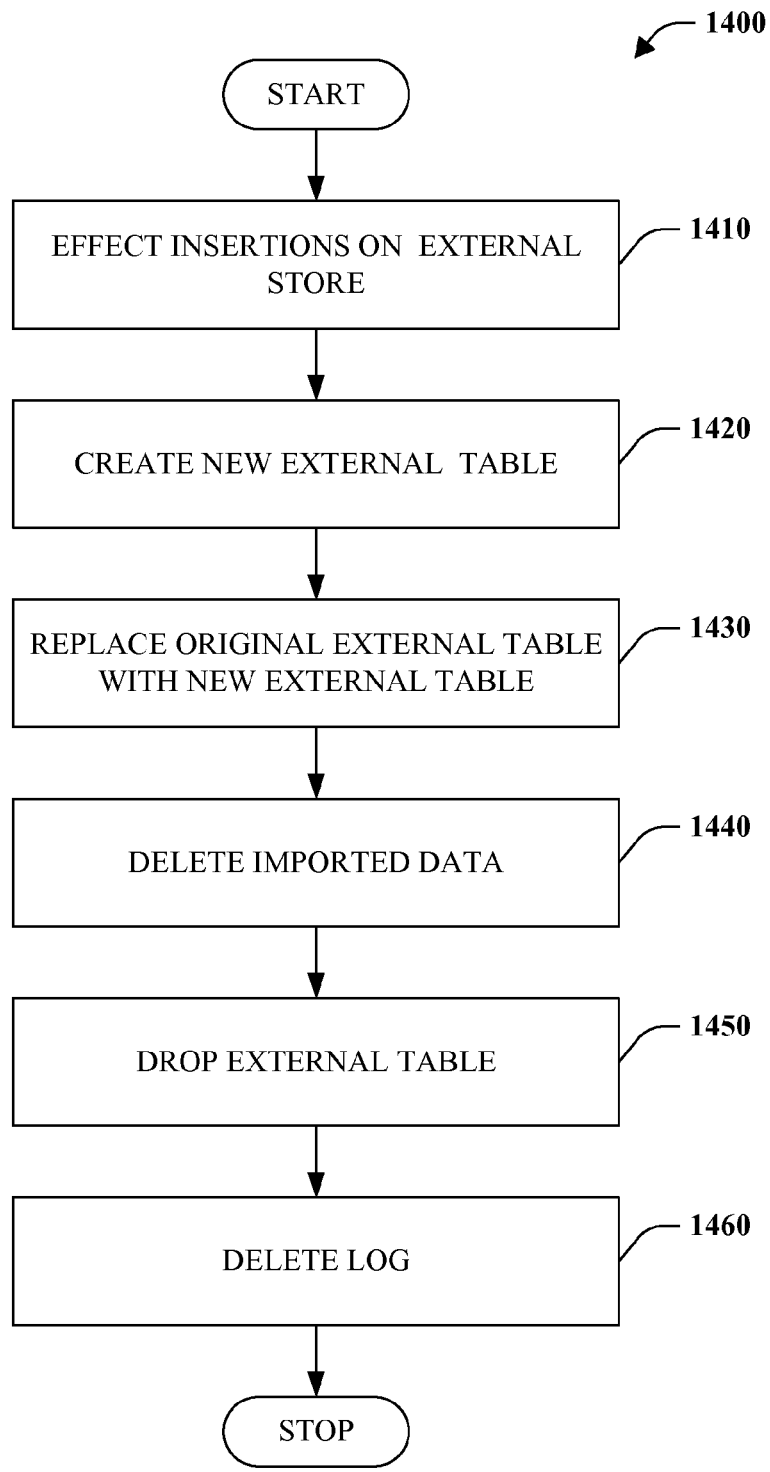
FIG. 14 is a flow chart diagram of a method of performing compaction

FIG. 14 depicts a method of performing compaction in accordance with a particular implementation. At reference numeral 1410, insertions are effected on a store. For example, a table recording insertions can be drained and the insertions effected on the store by invoking an operation on a storage system that causes the data to be added. For example, if the data management system corresponds to Hadoop, an append operation is supported and can be called to append a corresponding file with additional data. At reference numeral 1420, a new external table comprising metadata that defines the structure and location of external data is created based an original external table. For example, a create external table as select (CETAS) operation can be invoked on primary storage system. In particular, data can be read or imported and the deleted data can be discarded during or after the read. Additionally, inserted data will be reflected in the read data. An external table is created based on this data. At numeral 1430, the original external table is replaced with the new external table. Read or imported data from a data store is deleted at 1440 and the corresponding external table is dropped (table metadata removed) at numeral 1450. At reference numeral, 1460 log or other container recording deleted data elements is deleted.

The subject disclosure supports various products and processes that perform, or are configured to perform, various actions regarding efficient data manipulation support. What follows are one or more exemplary methods and systems.

A method comprises employing at least one processor configured to execute computer-executable instructions stored in a memory to perform the following acts: receiving a data manipulation statement specifying an in-place data manipulation with respect to a data store associated with a data storage system that does not support the in-place data manipulation; recording the data manipulation in a container; and applying one or more recorded data manipulations in the container to data read from the data store. The method further comprises recording the data manipulation in the container associated with an external table that defines structure for and identifies location of data stored in the data store. The method further comprises: comparing a reference to a subset of the data stored in the data store with one or more references recorded in the container; and initiating reading the subset of the data in the data store only if the subset of the data is not identified in the container. The method further comprises: receiving data from the data store; comparing the data with one or more delete data manipulations in the container; and discarding the data if it is subject to one of the one or more delete manipulations. The method further comprises saving data to be added to the data store in accordance with an insert data manipulation in the container. The method further comprises reading the data saved in the container and initiating appending the data to a data set in data store. The method further comprises: receiving data from the data store; reading the data saved in the container; and adding the data saved in the container to received data. The method further comprises initiating application of the data manipulation on the data store after the container reaches a size that meets a predetermined threshold. The method further comprises importing a data set from the data store, modifying the data set with the one or more recorded data manipulations, and exporting the data set to the data store.

A system comprises a processor coupled to a memory, the processor configured to execute the following computer-executable components stored in the memory: a first component configured to record in a change log an in-place data manipulation that targets a data store of a data storage system that does not support the in-place manipulation; and a second component configured to apply one or more recorded manipulations in the change log to data read from the data store. The system further comprises a third component configured to discard data stored in the data store during a read of the data store if the data is referenced in the change log. The system further comprises a third component configured to remove data referenced in the change log from data read from the data store. The system further comprises a third component configured to save data to be added to the data store to a second change log. The system further comprises a fourth component configured to acquire the data from the second change log and initiate an operation that appends the data to a data set in the data store. The system further comprises a third component configured to initiate application of changes to the data store, by writing a new data set including changes to the data store, after the change log reaches a threshold size. The threshold size represents a point at which cost to record and apply manipulations on the first data storage system exceeds cost to apply the manipulations to the data store.

A computer-readable storage medium having instructions stored thereon that enable at least one processor to perform a method upon execution of the instructions, the method comprising: maintaining a change log comprising one or more unique identifiers that identify data to be deleted in-place on a data store of a data management system as specified by a data-manipulation-language statement, wherein the data management system does not support in-place deletion; and initiating deletion of identified data in the change log after an amount of data identified by the change log reaches a predetermined threshold, wherein deletion is implemented by receiving a data set stored on the data store, removing identified data from the data set, and writing a new data set to the data store. The method further comprises discarding data stored in the data store during reading of the data if the data is identified in the change log.

The method further comprises acquiring data from the data store and subsequently removing data identified in the change log.

A system comprises means for recording in a change log an in-place data manipulation directed to a data store associated with a data storage system that does not support the in-place data manipulation; and means for applying one or more in-place data manipulations in the change log to data read from a data store. The means for applying further comprises disregarding data designated for deletion in the change log during a read from the data storage system. The means for applying further comprises disregarding data designated for deletion in the change log after data is read from the data storage system. The means for applying further comprises adding data designated for insertion in the change log to the data read from the data storage system. The system further comprises means for effecting application of the one or more in-place data manipulations in the change log to the data store. The means for effecting further comprises exporting a copy of the data read with manipulations applied to the data store. The system further comprising means for triggering the means for effecting when cost to record and apply manipulations exceeds cost to effect the manipulations on the data store.

Aspects of the subject disclosure pertain to the technical problem of providing support for in-place data manipulations over data associated with a data storage system that does not provide support for in-place data manipulations. The technical features associated with addressing this problem involve recording manipulations and applying the manipulations to data acquired from a data store. Recorded manipulations can be applied to the data itself, for example after meeting a predetermined threshold associated with recording manipulations or in accordance with schedule. However, applying manipulations to the data can be costly in terms of resource utilization (e.g., storage space, network bandwidth . . . ) and processing time. Rather than incurring the high cost associated with performing in-place data manipulations for each manipulation on systems without support therefor, the cost is avoided or at least delayed (and batch processed) by recording the manipulation and applying the manipulation. Accordingly, aspects of the disclosure exhibit technical effects with respect to efficient use of resources including but not limited to increasing processing speed, reducing processor load, memory conservation, and reduced network bandwidth usage.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component.

One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 15:
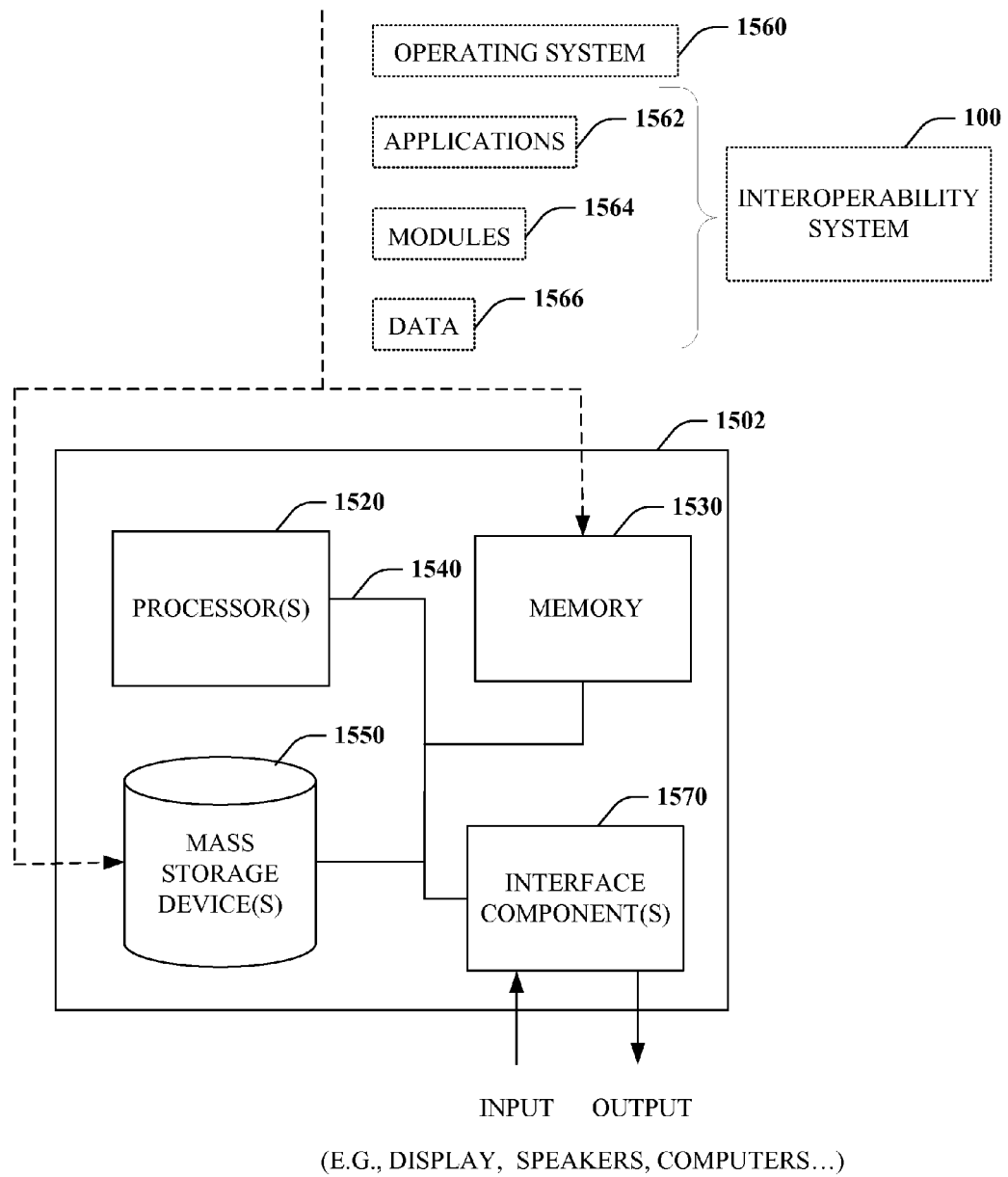
FIG. 15 is a schematic block diagram illustrating a suitable operating environment for aspects of the subject disclosure.

In order to provide a context for the claimed subject matter, FIG. 15 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory devices.

With reference to FIG. 15, illustrated is an example general-purpose computer or computing device 1502 (e.g., desktop, laptop, tablet, watch, server, hand-held, programmable consumer or industrial electronics, set-top box, game system, compute node . . . ). The computer 1502 includes one or more processor(s) 1520, memory 1530, system bus 1540, mass storage device(s) 1550, and one or more interface components 1570. The system bus 1540 communicatively couples at least the above system constituents. However, it is to be appreciated that in its simplest form the computer 1502 can include one or more processors 1520 coupled to memory 1530 that execute various computer executable actions, instructions, and or components stored in memory 1530.

The processor(s) 1520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1502 can include or otherwise interact with a variety of computer-readable media to facilitate control of the computer 1502 to implement one or more aspects of the claimed subject matter. The computer-readable media can be any available media that can be accessed by the computer 1502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1530 and mass storage device(s) 1550 are examples of computer-readable storage media. Depending on the exact configuration and type of computing device, memory 1530 may be volatile (e.g., RAM), non-volatile (e.g., ROM, flash memory . . . ) or some combination of the two. By way of example, the basic input/output system (BIOS), including basic routines to transfer information between elements within the computer 1502, such as during start-up, can be stored in nonvolatile memory, while volatile memory can act as external cache memory to facilitate processing by the processor(s) 1520, among other things.

Mass storage device(s) 1550 includes removable/non-removable, volatile/non-volatile computer storage media for storage of large amounts of data relative to the memory 1530. For example, mass storage device(s) 1550 includes, but is not limited to, one or more devices such as a magnetic or optical disk drive, floppy disk drive, flash memory, solid-state drive, or memory stick.

Memory 1530 and mass storage device(s) 1550 can include, or have stored therein, operating system 1560, one or more applications 1562, one or more program modules 1564, and data 1566. The operating system 1560 acts to control and allocate resources of the computer 1502. Applications 1562 include one or both of system and application software and can exploit management of resources by the operating system 1560 through program modules 1564 and data 1566 stored in memory 1530 and/or mass storage device (s) 1550 to perform one or more actions. Accordingly, applications 1562 can turn a general-purpose computer 1502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, interoperability system 100 or portions thereof, can be, or form part, of an application 1562, and include one or more modules 1564 and data 1566 stored in memory and/or mass storage device(s) 1550 whose functionality can be realized when executed by one or more processor(s) 1520.

In accordance with one particular embodiment, the processor(s) 1520 can correspond to a system on a chip (SOC) or like architecture including, or in other words integrating, both hardware and software on a single integrated circuit substrate. Here, the processor(s) 1520 can include one or more processors as well as memory at least similar to processor(s) 1520 and memory 1530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the interoperability system 100 and/or associated functionality can be embedded within hardware in a SOC architecture.

The computer 1502 also includes one or more interface components 1570 that are communicatively coupled to the system bus 1540 and facilitate interaction with the computer 1502. By way of example, the interface component 1570 can be a port (e.g., serial, parallel, PCMCIA, USB, FireWire . . . ) or an interface card (e.g., sound, video . . . ) or the like. In one example implementation, the interface component 1570 can be embodied as a user input/output interface to enable a user to enter commands and information into the computer 1502, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1570 can be embodied as an output peripheral interface to supply output to displays (e.g., LCD, LED, plasma . . . ), speakers, printers, and/or other computers, among other things. Still further yet, the interface component 1570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of updating a data set stored in a data store in response to a data query specified in a data manipulation language, the method comprising:
   employing at least one processor configured to execute computer-executable instructions stored in a memory to perform the following acts:
      identifying, in the data query, a data manipulation statement specifying a data manipulation of a specified portion of a record of the data set, and specifying, in the data manipulation language, that the data manipulation statement is to be applied in-place to the data set stored in the data store;
      modifying the specified portion of the record in the data store by:
         identifying a location of the specified portion of the record in the data store; and
         overwriting the location of the specified portion of the record with the data manipulation while refraining from rewriting portions of the record that do not include the specified portion of the record;
      comparing a reference to a subset of the data set stored in the data store with one or more references recorded in a container; and
      initiating reading of the subset of the data set in the data store only if the subset of the data set is not identified in the container.

2. The method of claim 1 further comprises recording the data manipulation in the container associated with an external table that defines structure for and identifies the location of the specified portion of the record in the data store.

3. The method of claim 1 further comprises:
   receiving data from the data store;
   comparing the data with one or more delete data manipulations in the container; and
   discarding the data if it is subject to one of the one or more delete manipulations.

4. The method of claim 1 further comprises saving data to be added to the data store in accordance with an insert data manipulation in the container.

5. The method of claim 4 further comprises reading the data saved in the container and initiating appending the data to the data set in data store.

6. The method of claim 4 further comprises:
   reading the data saved in the container; and
   adding the data saved in the container to received data.

7. The method of claim 1 further comprises initiating application of the data manipulation on the data store after the container reaches a size that meets a predetermined threshold.

8. The method of claim 1 further comprises importing the data set from the data store, modifying the imported data set with the data manipulation, and exporting the imported data set to the data store.

9. The method of claim 1, wherein:
   the specified portion of the data set stored in the data store is not modifiable when the data manipulation statement is identified in the data query; and modifying the specified portion of the data set in-place further comprises:

storing the data manipulation in a change log;

determining, at a second time after the identifying, that the data set is modifiable; and responsive to the determining, applying the change log to the specified portion of the data set in-place in the data store while refraining from modifying other portions of the data set that are not included in the specified portion.

10. A system that updates a data set stored in a data store stored by a data storage system in response to a data query specified in a data manipulation language, the system comprising:

a processor coupled to a memory, the processor configured to execute the following computer-executable components stored in the memory:

a first component configured to identify, in the data query, a data manipulation statement specifying a data manipulation of a specified portion of a record of the data set, and specifying, in the data manipulation language, that the data manipulation statement is to be applied in-place to the data set stored in the data store;

a second component configured to modify the specified portion of the record in the data store by:

identifying a location of the specified portion of the record in the data store; and overwriting the location of the specified portion of the record with the data manipulation while refraining from rewriting portions of the record that do not include the specified portion of the record; and a third component configured to record, in a change log, the data manipulation statement that targets the data store of the data storage system that does not support the in-place manipulation.

11. The system of claim 10 further comprises a fourth component configured to discard data stored in the data store during a read of the data store if the data is referenced in the change log.

12. The system of claim 10 further comprises a fourth component configured to remove data referenced in the change log from data read from the data store.

13. The system of claim 10 further comprises a fourth component configured to save data to be added to the data store to a second change log.

14. The system of claim 13 further comprises a fourth component configured to acquire the data from the second change log and initiate an operation that appends the data to the data set in the data store.

15. The system of claim 10 further comprises a fourth component configured to initiate application of changes to the data store, by writing a new data set including the changes to the data store, after the change log reaches a threshold size.

16. The system of claim 15, wherein the threshold size represents a point at which a cost to record and apply manipulations exceeds a cost to apply the manipulations to the data store.

17. A computer-readable storage medium having instructions stored thereon that enable at least one processor to perform a method, upon execution of the instructions, of updating a data set stored in a data store stored by a data management system in response to a data query specified in a data manipulation language, the method comprising:

identifying, in the data query, a data manipulation statement specifying a data manipulation of a specified portion of a record of the data set, and specifying, in the data manipulation language, that the data manipulation statement is to be applied in-place to the data set stored in the data store;

modifying the specified portion of the record in the data store by:

identifying a location of the specified portion of the record in the data store; and overwriting the location of the specified portion of the record with the data manipulation while refraining from rewriting portions of the record that do not include the specified portion of the record; and recording the modifying of the specified portion of the data set in a change log comprising one or more unique identifiers that identify data subject to the data manipulation applied in-place to the data store of the data management system as specified by the data manipulation language statement, wherein the data management system does not support in-place manipulation.

18. The computer-readable storage medium of claim 17, the method further comprises discarding data stored in the data store during reading of the data if the data is identified in the change log.

19. The computer-readable storage medium of claim 17, the method further comprises acquiring data from the data store and subsequently removing data identified in the change log.

20. A system that updates a data set stored in a data store stored by a data storage system in response to a data query specified in a data manipulation language, the system comprising:

means for identifying, in the data query, a data manipulation statement specifying a data manipulation of a specified portion of a record of the data set, and specifying, in the data manipulation language, that the data manipulation statement is to be applied in-place to the data set stored in the data store;

means for recording, in a change log, the data manipulation directed to the data store associated with the data storage system that does not support the in-place manipulation; and means for modifying the record by:

identifying a location of the specified portion of the record in the data store; and overwriting the location of the specified portion of the record with the data manipulation while refraining from rewriting portions of the record that do not include the specified portion of the record.

21. The system of claim 20, further comprises means for disregarding data designated for deletion in the change log during a read from the data storage system.

22. The system of claim 20, further comprises means for disregarding data designated for deletion in the change log after a read from the data storage system.

23. The system of claim 20, further comprises means for adding data designated for insertion in the change log to the data read from the data storage system.

24. The system of claim 20, further comprises means for exporting a copy of the data read with manipulations applied to the data store.

25. The system of claim 20 further comprises means for triggering the means for modifying the record when a cost to record and apply manipulations exceeds a cost to effect the manipulations on the data store.

* * * * *